United States Patent
Paden et al.

(10) Patent No.: US 7,265,470 B1
(45) Date of Patent: Sep. 4, 2007

(54) MAGNETIC SPRING AND ACTUATORS WITH MULTIPLE EQUILIBRIUM POSITIONS

(75) Inventors: Bradley Evan Paden, Santa Barbara, CA (US); Chen Chen, Santa Barbara, CA (US); Orlo James Fiske, Goleta, CA (US)

(73) Assignee: Launchpoint Technologies, Inc., Goleta, CA (US)

( * ) Notice: Subject to any disclaimer, the term of this patent is extended or adjusted under 35 U.S.C. 154(b) by 379 days.

(21) Appl. No.: 11/034,258

(22) Filed: Jan. 13, 2005

Related U.S. Application Data

(60) Provisional application No. 60/543,865, filed on Feb. 10, 2004, provisional application No. 60/535,803, filed on Jan. 13, 2004.

(51) Int. Cl.
*H02K 21/00* (2006.01)
*H02K 41/02* (2006.01)
*H02K 35/02* (2006.01)
*H02K 1/17* (2006.01)

(52) U.S. Cl. .............. 310/156.43; 310/12; 310/103

(58) Field of Classification Search .......... 310/103, 310/105, 112, 114, 115, 156.28, 156.43, 12, 310/42; 335/210, 212, 222, 229, 234, 296, 335/299, 306
See application file for complete search history.

(56) References Cited

U.S. PATENT DOCUMENTS

| | | | | |
|---|---|---|---|---|
| 3,788,447 A | * | 1/1974 | Stephanoff | 198/619 |
| 3,958,842 A | * | 5/1976 | Telle | 310/90.5 |
| 4,598,221 A | * | 7/1986 | Lawson et al. | 310/103 |
| 4,862,128 A | * | 8/1989 | Leupold | 335/306 |
| 5,017,819 A | | 5/1991 | Patt et al. | |
| 5,038,063 A | | 8/1991 | Graber et al. | |
| 5,148,066 A | | 9/1992 | Beale et al. | |
| 5,280,209 A | * | 1/1994 | Leupold et al. | 310/156.41 |
| 5,302,872 A | * | 4/1994 | Ohki et al. | 310/12 |
| 5,965,962 A | * | 10/1999 | Hinds | 310/12 |
| 6,025,659 A | * | 2/2000 | Nashiki | 310/12 |
| 6,104,108 A | * | 8/2000 | Hazelton et al. | 310/12 |
| 6,374,746 B1 | | 4/2002 | Fiske | |
| 6,684,794 B2 | | 2/2004 | Fiske et al. | |
| 6,841,910 B2 | * | 1/2005 | Gery | 310/103 |
| 2003/0192449 A1 | | 10/2003 | Fiske et al. | |

* cited by examiner

*Primary Examiner*—Tran Nguyen
(74) *Attorney, Agent, or Firm*—Dennis R. Haszko

(57) ABSTRACT

Arrays of magnets configured to create linear or rotary magnetic springs with multiple equilibrium points. Some of the equilibrium points are stable, while others are unstable. No mechanical contact is required between moving and stationary elements of the magnetic springs, resulting in a virtually unlimited lifetime. The magnetic springs can be utilized in conjunction with low force electromagnetic actuators to implement multi-step linear or rotary actuators with high force, very short movement time between unstable equilibrium points, and with near-zero holding power required to maintain actuator position at any unstable equilibrium point. Specific applications that embody the present invention may include, but are not limited to, optical filters, linear valves, or any mechanism that would benefit from an efficient magnetic spring.

14 Claims, 14 Drawing Sheets

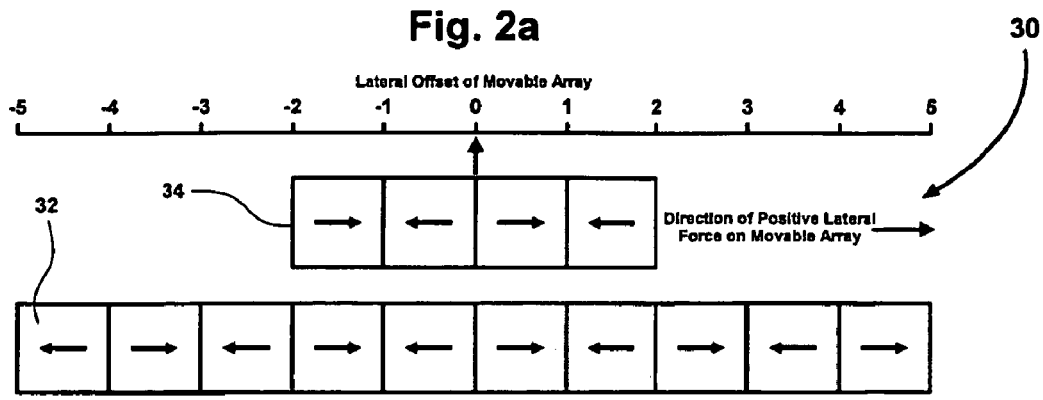
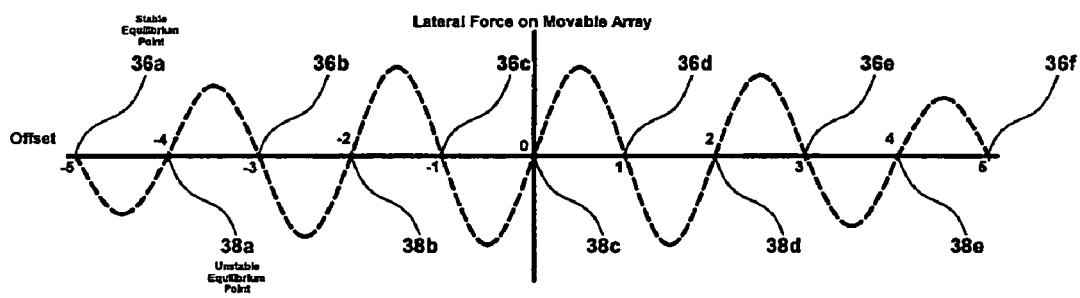
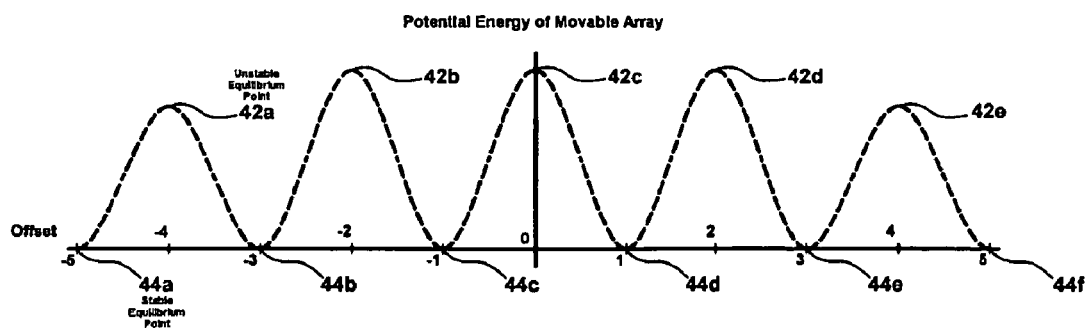

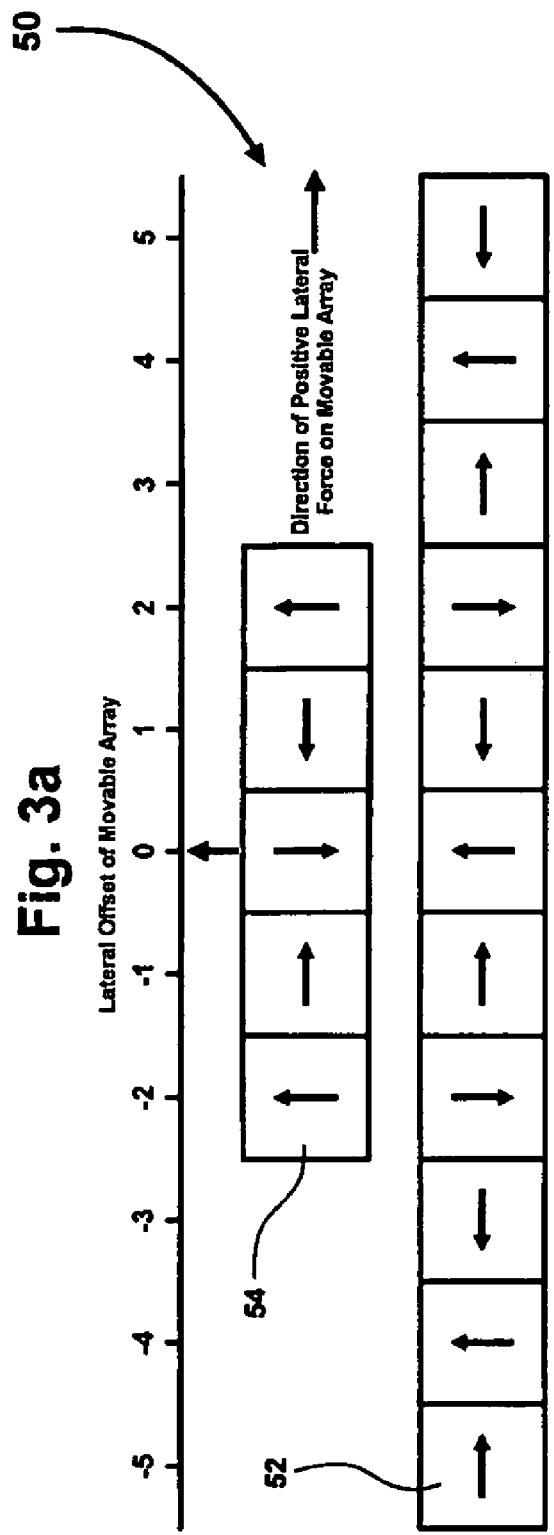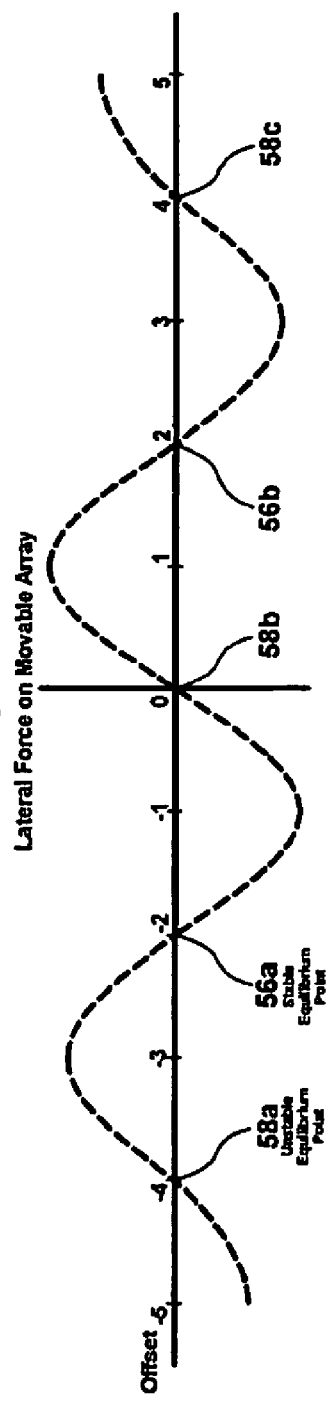

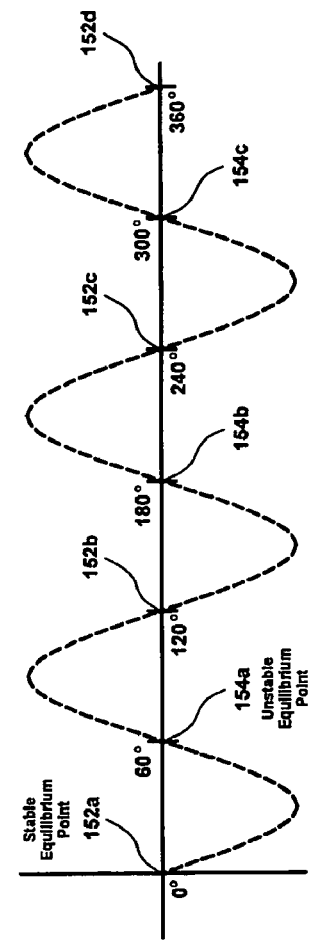
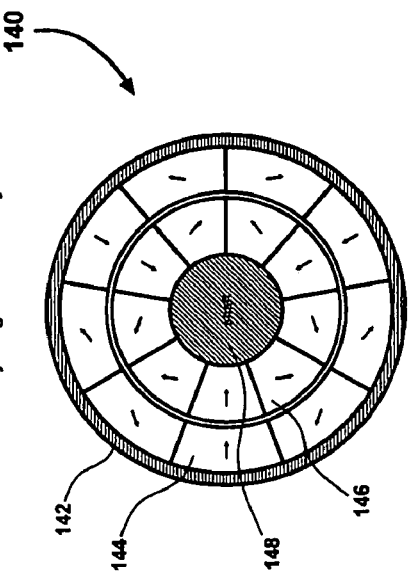
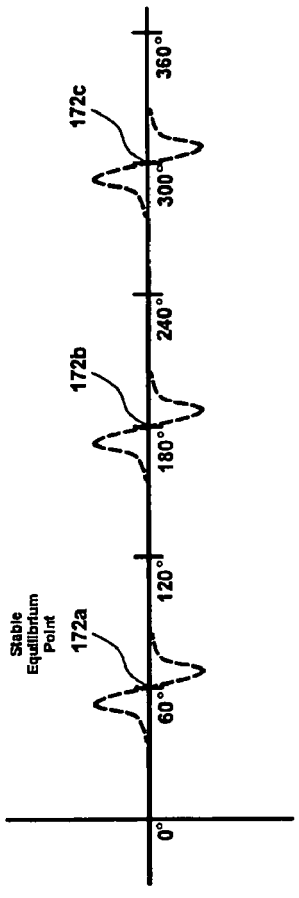
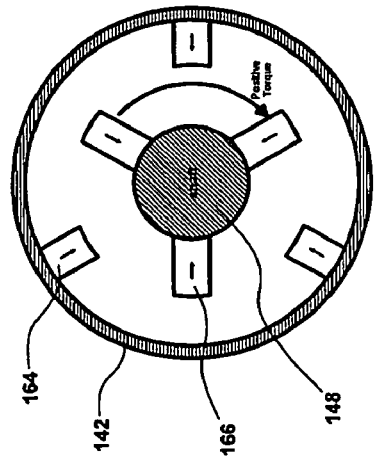

Torque vs Rotation of Combined Assembly

Potential Energy vs Rotation of Combined Assembly

Fig. 13a
Valve Closed
magnetic
valve spring
296
Fig. 13b
Valve Open
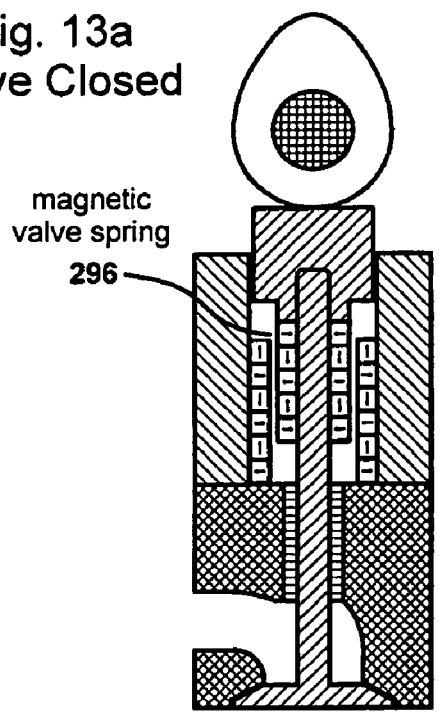
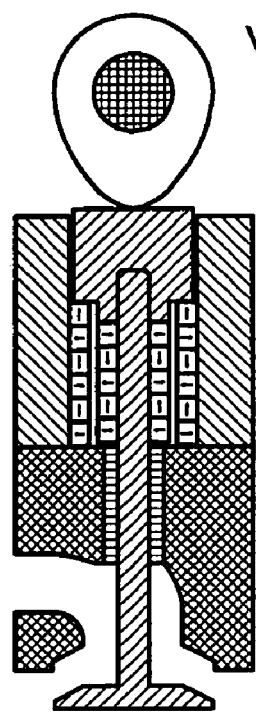
Fig. 13c  Force vs Compression
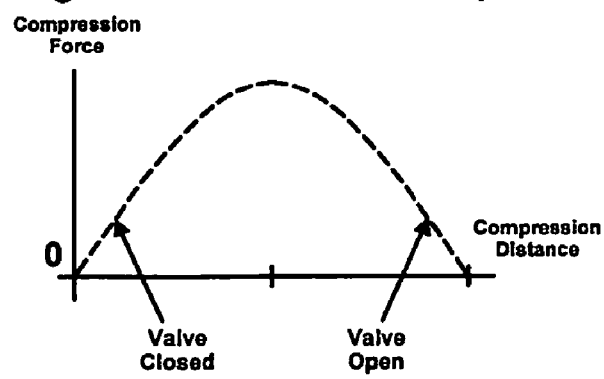

Fig. 14a Valve Closed
magnetic valve spring
298
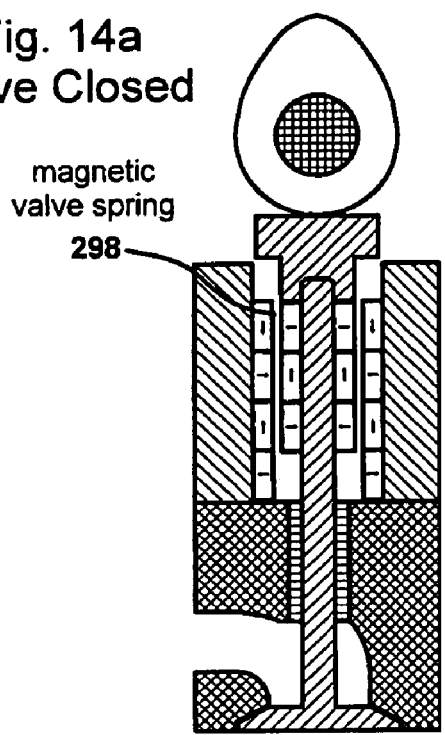
Fig. 14b Valve Open
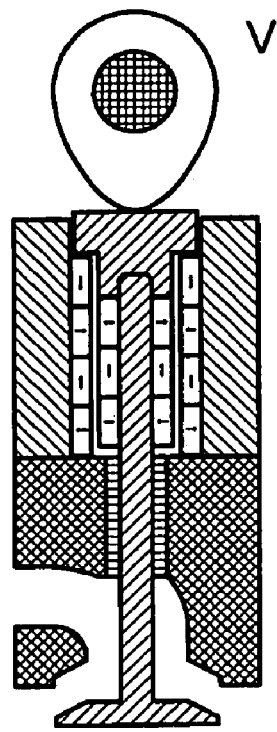
Fig. 14c Force vs Compression
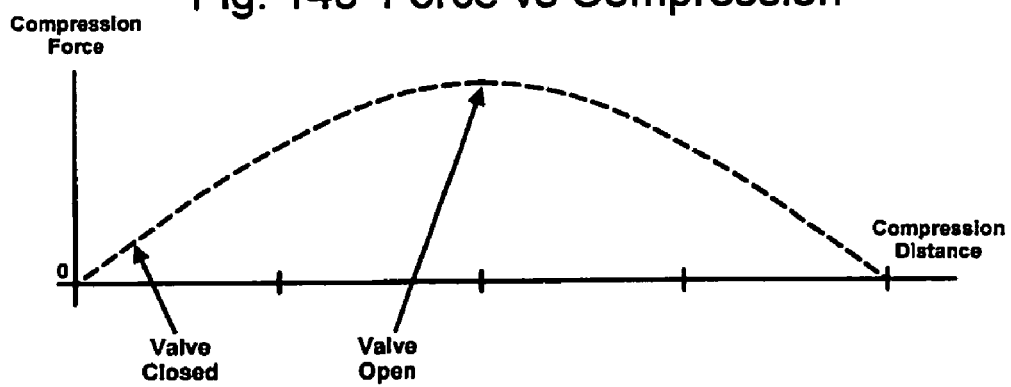

MAGNETIC SPRING AND ACTUATORS WITH MULTIPLE EQUILIBRIUM POSITIONS

CROSS-REFERENCE TO RELATED APPLICATIONS

This application claims priority from U.S. Provisional Patent Applications Nos. 60/535,803 filed on Jan. 13, 2004 and 60/543,865 filed on Feb. 10, 2004.

FIELD OF THE INVENTION

This invention relates to apparatus and methods for creating linear or rotary magnetic springs with multiple equilibrium positions. More specifically, such magnetic springs can form multi-position linear or rotary actuators.

BACKGROUND OF THE INVENTION

Electric motors of various types are commonly used to rapidly move an object linearly from one stationary position to another or to rotate an object from one stationary angular position to another by accelerating and then decelerating the object. The motor converts electric energy into the kinetic energy of the moving object during acceleration, and then brakes the object by converting that kinetic energy into another form such as heat during the deceleration. However, in some applications such motors are incapable of providing adequate speed of movement while also limiting their power consumption, size, and control complexity to acceptable levels. Such electric motors may serve as rotary or linear actuators and have been used in various applications such as, but not limited to, internal combustion engine valves.

Another method commonly used to rapidly move or rotate an object is to employ a mechanical spring. The initial position of the object is set by stretching or compressing a spring, or set of springs, such that a certain amount of potential energy is stored in the springs. When the spring is released the object is accelerated and the potential energy is converted into kinetic energy. After the object passes the position where all potential energy has been converted, it begins to decelerate and the kinetic energy is converted back to potential energy. The object can be captured at the end of its travel with the same potential energy as it had at the start, at the cost of only a small input of energy to compensate for energy lost to friction and heat, for example. In comparison with motor-driven switching, a spring mechanism involves greatly reduced power consumption due to its ability to efficiently convert potential energy to kinetic energy, and vice-versa, in a passive manner. In many applications a spring mechanism is also simpler and smaller.

Conventional mechanical springs are shown in FIGS. 1a and 1c. FIG. 1a shows a conventional coil spring system 10. Assuming the left end of spring 16 is attached to stationary element 12, when moving element 14, attached to the right end of spring 16, is moved laterally, left or right, the spring produces a linear force as depicted in the graph of FIG. 1c. Specifically, when the spring is stretched to the right it produces a negative force, proportional to the offset or distance of movement, which tends to restore the spring to its original length. When the spring is compressed to the left it produces a positive force, proportional to the offset or distance of movement, which again tends to restore the spring to its original length.

FIG. 1b shows a known arrangement of magnets 20 that exhibits behavior analogous to that of a coil spring. Note that permanent magnets are depicted in FIG. 1b, but electromagnets can be conventionally substituted in any such arrangement to produce the same effect as permanent magnets. Examples of such magnetic springs may be found in the linear magnetic springs of U.S. Pat. No. 5,017,819 issued to Patt et al. and U.S. Pat. No. 5,148,066 issued to Beale et al. and the rotary magnetic spring of U.S. Pat. No. 5,038,063, each of which are herein incorporated by reference.

With continued reference to FIG. 1b, it is shown that if the leftmost magnet 22 and the rightmost magnet 26 are fixed in stationary positions and the center magnet 24 is moved left or right, within a limited range of movement the interaction of the magnetic fields of the three magnets produces a restoring force similar to that depicted in the graph of FIG. 1c. In FIG. 1d, a graph shows the preferred force characteristics versus offset of an idealized, hypothetical high performance switching mechanism. Mechanical spring-based mechanisms are unable to achieve this type of performance, whereas such high performance is more likely via magnet-based mechanisms.

A major drawback that limits the achievable switching speed and utility of a mechanical spring-based switch is the large force or torque typically required to hold the object in position prior to or after the switching movements. If switching speed requirements are too high to allow mechanical capture at the end of travel, an electric actuator such as an electromagnet is needed to provide the holding force or torque, producing a constant power drain when the object is stationary. The force or torque of a mechanical spring increases in proportion to the displacement, as depicted in FIG. 1c. As the required switching speed increases, the force capability of the spring must also increase, which increases the required holding force or torque, which increases the required current in the electric actuator, which can quickly lead to unacceptable levels of power consumption. The high force that accompanies large displacements also makes it exceedingly difficult to achieve "soft landing"—i.e., a low impact speed at the end of travel.

Although the holding force in a mechanical spring system can sometimes be reduced through a complicated combination of springs and other mechanisms, such as in a compound bow, the complexity of those devices limits the switching speed and also brings about issues of size, cost, reliability, and so forth. Another drawback of a mechanical spring system relates to the periodic deformation of the spring that induces high-frequency internal friction in the spring material. This not only causes energy loss, but also is a potential source of fatigue failure in high speed switching applications.

It is desirable to have a switching mechanism that eliminates the need for significant holding force or torque at the stationary positions as well as the fatigue and energy loss characteristics of a spring, while retaining the advantages of a spring mechanism. Preferably, it would possess a force-displacement characteristic as shown in FIG. 1d. Here, the curve AOB represents a switching process between two stationary positions, A and B, where the spring force/torque is zero so that no hold force/torque is required. Since these points are located at the maximum displacements in a switching cycle, they correspond to the maximum potential energy and thus unstable equilibrium. Therefore, if the object is displaced a short distance from point A in the positive direction it would encounter a force/torque in the same direction that would tend to drive the object further from point A. When moving from point A to point 0, the object would be accelerated as potential energy is converted into kinetic energy. From point 0 to point B, the object would be decelerated as kinetic energy is converted back into potential energy. Virtually no energy input would be needed to accomplish the switching process. The middle point 0 is a stable equilibrium position.

SUMMARY OF THE INVENTION

Arrays of magnets are configured to create linear or rotary magnetic springs with multiple equilibrium points. Some of the equilibrium points are stable, while others are unstable. No mechanical contact is required between moving and stationary elements of the magnetic springs, resulting in a virtually unlimited lifetime. The magnetic springs can be utilized in conjunction with low force electromagnetic actuators to implement multi-step linear or rotary actuators with high force, very short movement time between unstable equilibrium points, and with near-zero holding power required to maintain actuator position at any unstable equilibrium point. Specific applications that embody the present invention may include, but are not limited to, linear valves, or any mechanism that would benefit from an efficient magnetic spring.

BRIEF DESCRIPTION OF THE DRAWINGS

FIG. 1b shows a magnetic analog to the mechanical spring of FIG. 1a.

FIG. 1c is a graph of the force characteristics versus offset of the moving end of the spring in FIG. 1a.

FIG. 2a shows fixed and moving arrays of magnetic dipoles with the moving array constrained to lateral motion in accordance with the present invention.

FIG. 2b is a graph of the lateral force experienced by the moving array of FIG. 2a in relation to its offset from the center of the fixed array.

FIG. 2c is a graph of the potential energy of the moving array of FIG. 2a in relation to its offset from the center of the fixed array.

FIG. 3a shows fixed and moving Halbach arrays of magnets with the moving array constrained to lateral motion in accordance with another embodiment of the present invention.

FIG. 3b is a graph of the lateral force experienced by the moving array of FIG. 3a in relation to its offset from the center of the fixed array.

FIG. 7a shows a variation of the rotary magnetic springs depicted in FIGS. 5a and 6b in accordance with another embodiment of the present invention.

FIG. 7b is a graph of the torque experienced by the shaft and inner magnet subassembly of FIG. 7a as they rotate clockwise with respect to the outer magnet subassembly.

FIG. 8a shows a torque modification assembly to be used in combination with the rotary magnetic spring of FIG. 7a in accordance with another embodiment of the present invention.

FIG. 8b is a graph of the torque experienced by the shaft and inner magnet subassembly of FIG. 8a as they rotate clockwise with respect to the outer magnet subassembly.

FIG. 13a is an enlarged cross-section of a magnetic valve spring with the valve in the closed position.

FIG. 13b is an enlarged cross-section of the magnetic valve spring of FIG. 13a with the valve in the open position.

FIG. 13c is a graph comparing the compression force vs. spring compression distance for the magnetic spring of FIGS. 13a and 13b.

FIG. 14a is an enlarged cross-section of another magnetic valve spring with the valve in the closed position.

FIG. 14b is an enlarged cross-section of the magnetic valve spring of FIG. 14a with the valve in the open position.

FIG. 14c is a graph comparing the compression force vs. spring compression distance for the magnetic spring of FIGS. 14a and 14b.

DETAILED DESCRIPTION OF PREFERRED EMBODIMENTS

Figure 1A:
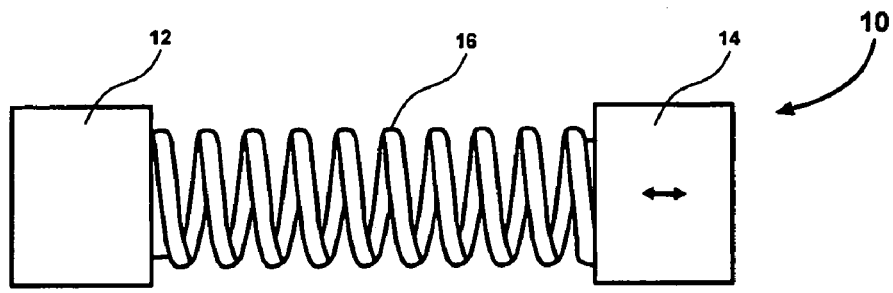
FIG. 1a shows a conventional mechanical spring.
Figure 1B:
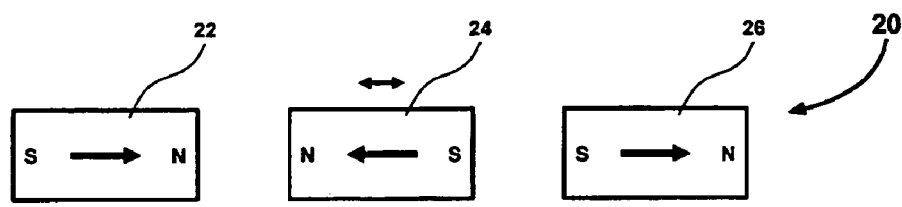
Figure 1C:
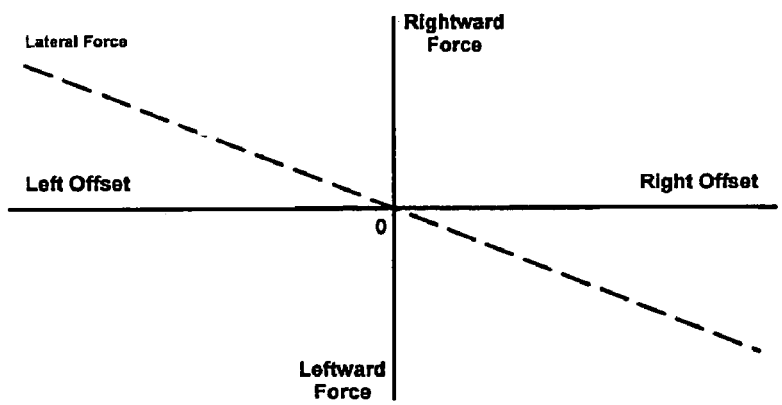
Figure 1D:
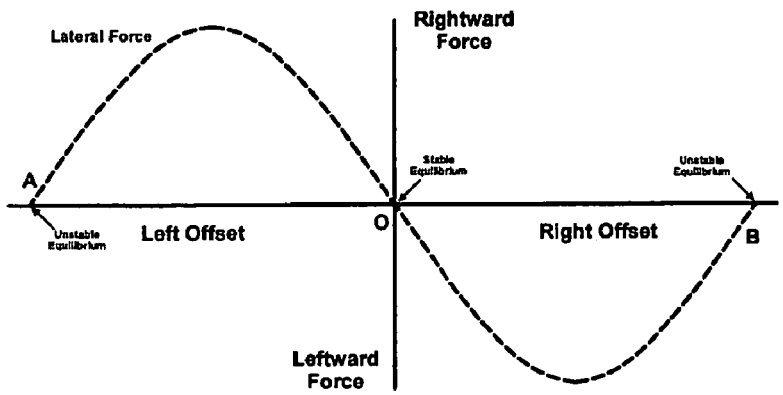
FIG. 1d is a graph of the preferred force characteristics versus offset of a high performance switching mechanism.

With reference to the drawings, FIG. 2a shows an arrangement of magnetic dipoles 30 according to the first embodiment of the invention. Here, a row of dipoles 32 is configured in a fixed or stationary array with each dipole rotated 180 degrees with respect to adjacent magnets. The poles depicted are horizontal but other angles would be acceptable as long as the rotation requirement is met. Such rotation requirement is utilized within Halbach arrays as discussed within U.S. Pat. No. 6,374,746 issued to Fiske on Apr. 23, 2002, U.S. Pat. No. 6,684,794 issued to Fiske et al. on Feb. 3, 2004, and U.S. patent application Ser. No. 10/412,082 filed on Apr. 10, 2003 by Fiske et al. and published on Oct. 16, 2003 as US Patent Application Publication No. 2003-0192449, each document of which is herein incorporated by reference. Accordingly, arrays 32 and 34 of FIG. 2a can be considered as Halbach arrays with a rotation increment of 180 degrees.

A movable array of magnets 34, using a similar configuration of alternating poles, is positioned in close proximity to fixed array 32. FIG. 2b graphs the net lateral force on movable array 34 caused by the interaction of the magnetic fields produced by the magnets in both the fixed and movable arrays. In this graph, positive lateral force is assumed to mean force that tends to accelerate movable array 34 to the right. Negative force is assumed to mean force that tends to accelerate movable array 34 to the left. As depicted in FIG. 2b, this lateral force exhibits cyclical behavior. In the zero-offset position shown in FIG. 2a, the lateral force is zero. However, if the offset is increased in either direction the lateral force will tend to accelerate the movable array away from the zero-offset position. In other words, this is an unstable equilibrium position. Positions 38a-e, as labeled in the graph, are all unstable equilibrium positions. At an offset of plus one or minus one, where one unit of offset is equivalent to one dipole length, the lateral force is again zero but here a small change in offset will produce lateral force tending to oppose movement. These are stable equilibrium points. Positions 36a-f, as labeled in the graph, are all stable equilibrium positions. In essence, this magnet configuration produces a periodic spring in which the direction of force changes at each equilibrium point. The total number of equilibrium points are determined by the length of the fixed array. Equilibrium points near the end of the fixed array produce lower force than intermediate equilibrium points due to the reduced number of magnets involved.

FIG. 2c provides another way of looking at the interaction of the two arrays. Here the potential energy of the movable array is graphed as a function of offset. Potential energy is highest at unstable equilibrium points 42a-e—i.e., the movable array is "balanced on a peak" and only a small force input is needed to induce it to "roll downhill". Such a small input force may be provided, for example, by a motor or some similar motive source with an external power supply in either a linear or rotary configuration as necessary. Ideally, in the absence of impediments such as excessive friction or physical barriers the movable array will pass through a stable equilibrium point 44a-f and then climb the next potential energy hill almost to the peak. At that point only a small force is needed to "capture" the array in position, and very low power is sufficient to stabilize the array in position. As explained in more detail below, this cyclical behavior can be exploited to create highly useful actuators with unique characteristics.

Figure 4A:
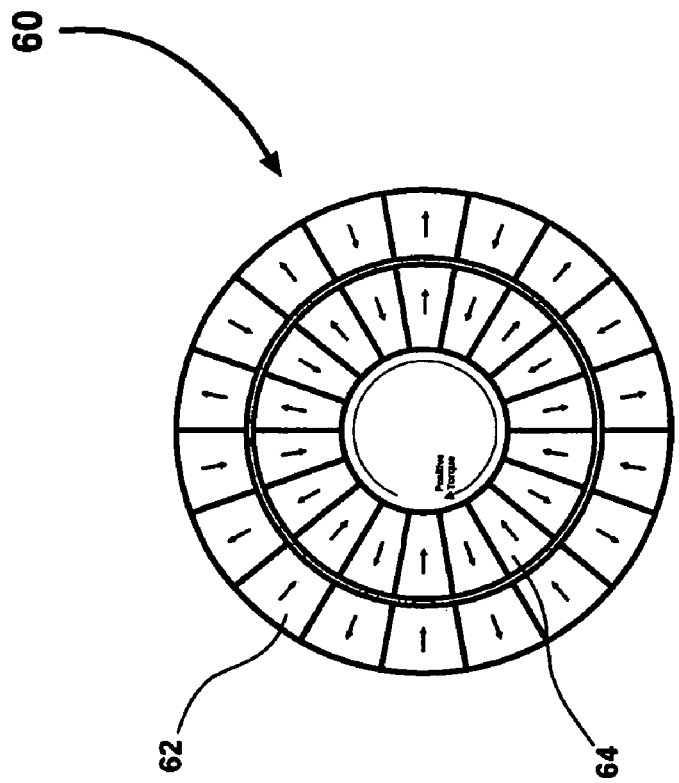
FIG. 4a shows concentric circular arrays of magnetic dipoles with the inner array configured to rotate with respect to the outer array in accordance with another embodiment of the present invention.
Figure 4B:
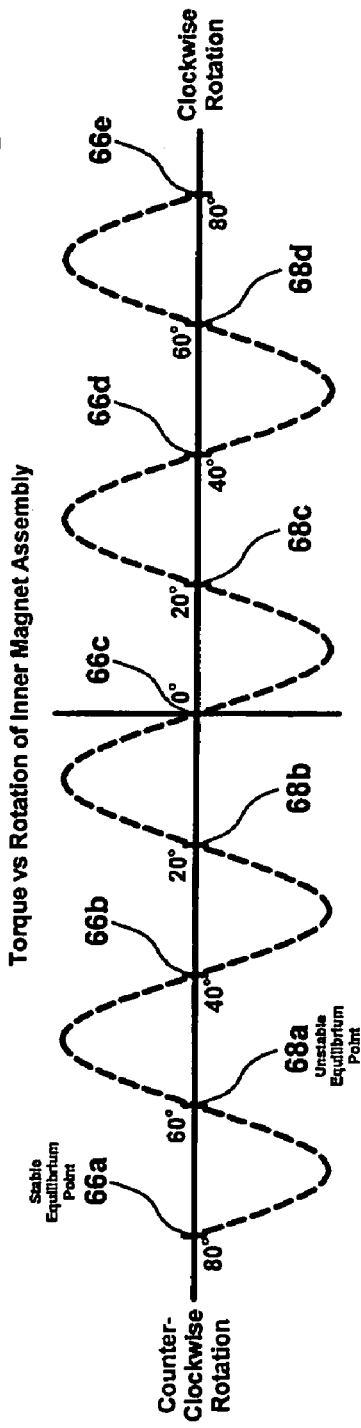
FIG. 4b is a graph of the torque experienced by the inner array of FIG. 4a in relation to its rotation with respect to the outer array.

FIG. 3a shows an arrangement of magnets 50 similar to that of FIG. 2a but modified according to the second embodiment of the invention. Here the magnets are configured as Halbach arrays, in which the direction of magnetization of each magnet within the movable array 54 is rotated clockwise as the array is traversed from left to right and the active surface faces downward toward fixed array 52. The direction of magnetization in fixed array 52 is rotated counterclockwise as the array is traversed from left to right with the active surface facing upward toward movable array 54. This has the effect of focusing the field produced by each array toward the opposing array to produce higher force per unit of mass of magnet material. Arrays 52 and 54 shown in FIG. 3a use 90 degrees of rotation from one magnet to the next, or four magnets per wavelength (360 degrees). However, it should be understood that more or less degrees of rotation may be used in order to produce shorter or longer wavelengths. The lateral force characteristics of arrays 52 and 54 in FIG. 3a are graphed in FIG. 3b. Stable equilibrium points 56a and 56b are one wavelength apart, as in FIG. 2b. Unstable equilibrium points 58a-c are also one wavelength apart. FIG. 4a shows a magnetic spring 60 according to the third embodiment of the invention. Here, concentric circular arrays of magnetic dipoles are arranged with inner array 64 configured such that it can be rotated with respect to outer array 62, or vice-versa. In FIG. 4a, the magnetic poles are oriented radially with alternating directions of magnetization, though the only requirement is that the magnetization direction alternates from one magnet to the next. This produces torque on movable inner array 64 that varies analogously to the lateral force on movable array 34 of FIG. 2a. FIG. 4b is a graph of the torque on inner array 64 of FIG. 4a in relation to its rotation with respect to outer array 62. Positive torque is assumed to be in the clockwise direction. The torque exhibits a cyclical, alternating behavior that produces stable equilibrium points 66a-e and unstable equilibrium points 68a-d similar to those in FIG. 2b. The configuration of FIG. 4a produces a periodic rotary spring in which the direction of the torque produced by the spring changes at each successive equilibrium point. The total number of unstable equilibrium points equals the number of magnet wavelengths contained in the circular arrays, as does the total number of stable equilibrium points.

Figure 5A:
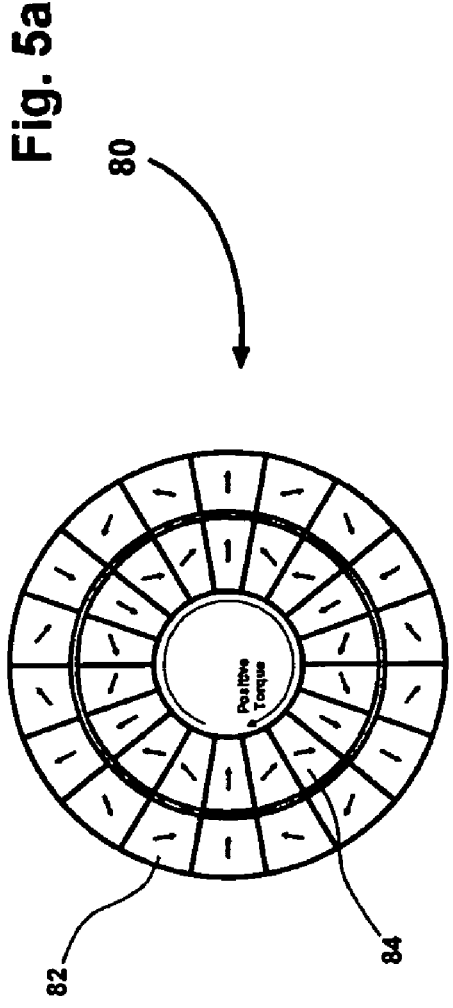
FIG. 5a shows concentric circular Halbach arrays of magnets with the inner array configured to rotate with respect to the outer array in accordance with another embodiment of the present invention.
Figure 5B:
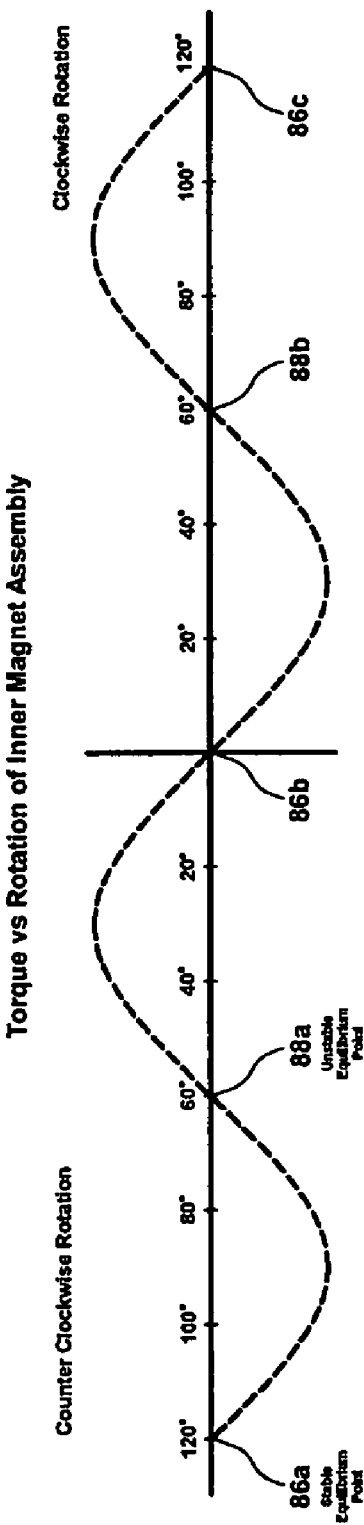
FIG. 5b is a graph of the torque experienced by the inner array of FIG. 5a in relation to its rotation with respect to the outer array.

FIG. 5a shows an arrangement of magnets 80 similar to that of FIG. 4a but modified according to the fourth embodiment of the invention. Here, the magnets are configured as concentric Halbach arrays, in which the direction of magnetization of each magnet in outer array 82 is rotated clockwise as the array is traversed clockwise. The direction of magnetization in inner array 84 is rotated counterclockwise as the array is traversed clockwise. Again, this has the effect of focusing the field produced by each array toward the opposing array to produce higher torque per unit of mass of magnet material. Arrays 82 and 84 shown in FIG. 5a use six magnets per wavelength and three wavelengths per array for a total of 18 magnets per array. However, it should be readily understood that more or less magnets may be used to produce shorter or longer wavelengths without straying from the intended scope of the present invention. Arrays 62 and 64 of FIG. 4a can be considered Halbach arrays with a rotation increment of 180 degrees. The torque experienced by inner array 84 of FIG. 5a as it rotates with respect to outer array 82 is graphed in FIG. 5b. Stable equilibrium points 86a-c are one wavelength (120 degrees) apart. Unstable equilibrium points 88a and 88b are also one wavelength apart.

Figure 6B:
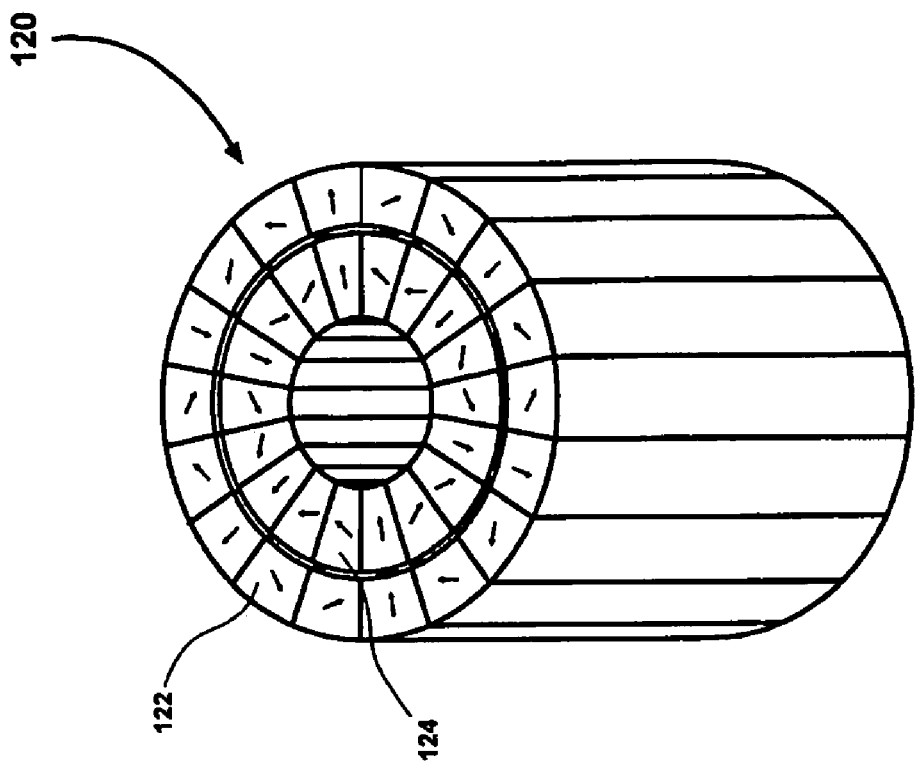
FIG. 6b shows a perspective view of concentric cylindrical Halbach arrays of magnets to provide magnetic spring torque in response to rotary motion of one array with respect to the other in accordance with another embodiment of the present invention.
Figure 6A:
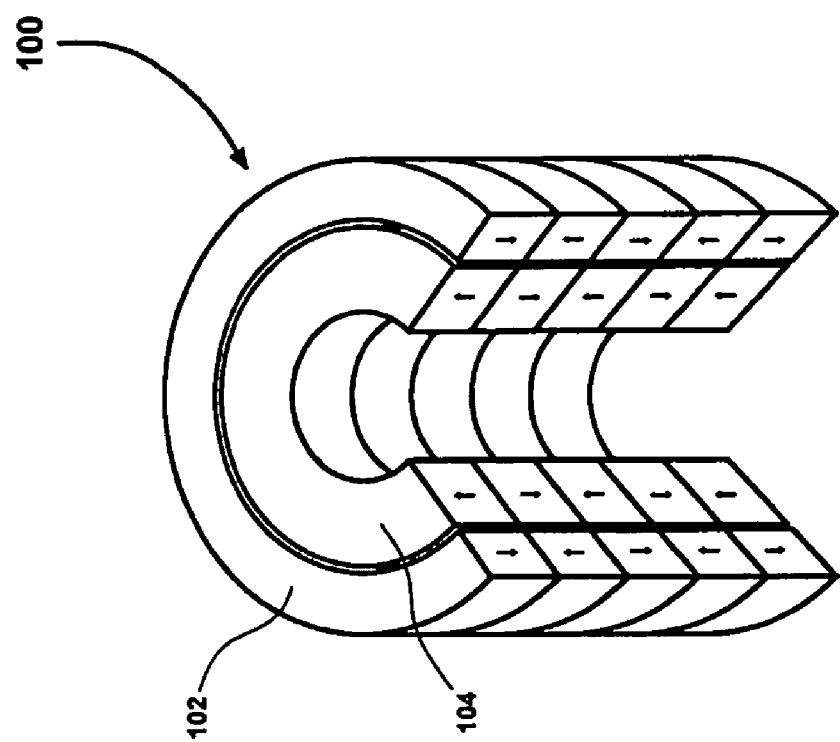
FIG. 6a shows a partial cutaway view of concentric cylindrical arrays of magnets configured to provide magnetic spring force in the axial direction in accordance with another embodiment of the present invention.

FIG. 6a is a partial cutaway view of magnetic spring system 100 in accordance with another embodiment of the present invention. Magnetic spring system 100 includes concentric cylindrical arrays of magnets 102 and 104 configured to provide spring force in the axial direction—i.e., a linear magnetic spring of the type depicted in FIG. 2a. Although shown as a cylinder in FIG. 6a, it should be understood that variations are well within the intended scope of the present invention such that the arrays could be square, "unrolled" flat, or configured in any other arrangement as long as the two magnet arrays are configured to provide multiple equilibrium points as one array moves linearly past the other.

FIG. 6b is a perspective view of magnetic spring system 120 in accordance with still another embodiment of the present invention. Magnetic spring system 120 includes concentric cylindrical Halbach arrays of magnets 122 and 124 configured to provide spring torque in response to rotary motion of one array with respect to the other as depicted in FIG. 5a.

FIGS. 7 through 10 depict one application of the rotary magnetic spring in accordance with the present invention and reveal some additional methods to extend capabilities of such an application. Specifically, FIGS. 7a and 8a show subassembly portions designed in accordance with the present invention and that are further combined within the apparatus of FIG. 9a to increase the advantageous characteristics of the present invention. While specific configurations are shown and described below, other configurations are possible without straying from the intended scope of the present invention.

FIG. 7a shows a cross-sectional view of primary magnet assembly 140 similar to that shown in FIGS. 5a and 6b. Outer magnet array 144 is mounted on the inside of stationary structural shell 142. Inner magnet array 146 is mounted on rotating axle shaft 148. These particular array configurations contain three magnetic wavelengths with three magnets per wavelength. The resulting torque characteristics for this configuration are graphed in FIG. 7b, with stable equilibrium points 152a-d and unstable equilibrium points 154a-c labeled.

FIG. 8a shows a cross-sectional view of torque modification magnet assembly 160 that can be used in combination with a rotary magnetic spring such as that in FIG. 7a. Within the torque modification magnet assembly 160, the inner subassembly 166 consists of three magnets mounted on the same rotating shaft 148 depicted in FIG. 7a. The outer subassembly 164 consists of three additional magnets mounted on the inside of stationary structural shell 142. The poles of all six magnets in arrays 164 and 166 are pointing radially inward, but they could all be pointed radially outward and produce the same effect. Indeed, any direction of magnetization is possible so long as the effect is that the inner and outer arrays 164, 166 are attracted to one another when in close proximity to one another. FIG. 8b graphs the torque characteristics of assembly 160 with stable equilibrium points 172a-c labeled accordingly.

Figure 9A:
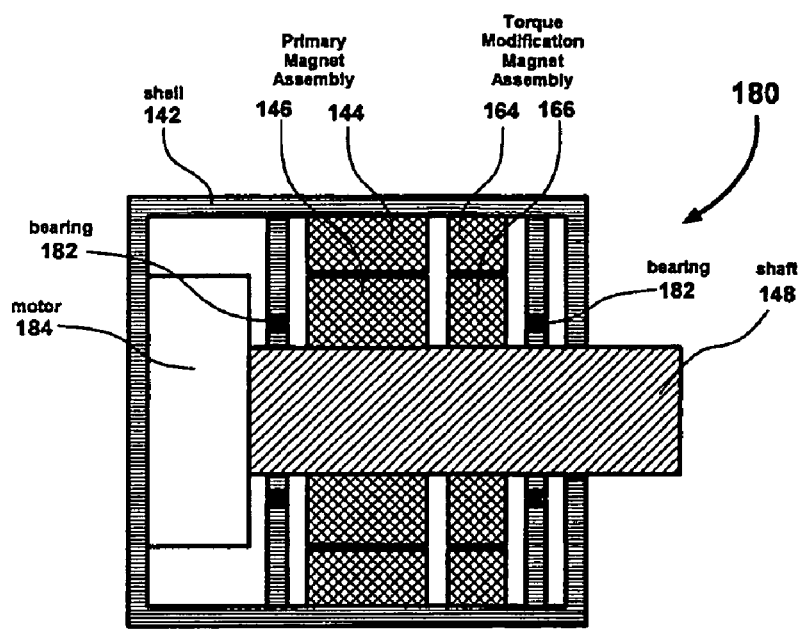
FIG. 9a shows a side view of a rotary actuator utilizing the primary magnet assembly of FIG. 7a and the torque modification magnet assembly of FIG. 8a in accordance with another embodiment of the present invention.

FIG. 9a shows a cross-sectional view of rotary actuator 180 employing primary magnetic assembly 140 in conjunction with torque modification assembly 160. Both assembly 140 and assembly 160 are mounted on rotating shaft 148, which is held in position by bearings 182. As shown, bearings 182 are ball bearings, but magnetic or other types of bearings can be used instead in a manner well known by one skilled in the motor/generator art. Ideally, such bearings should impart minimal friction. Motor 184 connects to one end of shaft 148, and works in conjunction with a control processor (not shown) and a rotary position sensor such as a shaft encoder (not shown). Such control processors and rotary position sensors may include, for example, a chip level central processing unit and hall effect sensor or some similar types of devices and will control motor movements based upon sensed positions. Such devices are well known in the motor/generator art and details of such are therefore not repeated here for purposes of clarity.

Figure 9B:
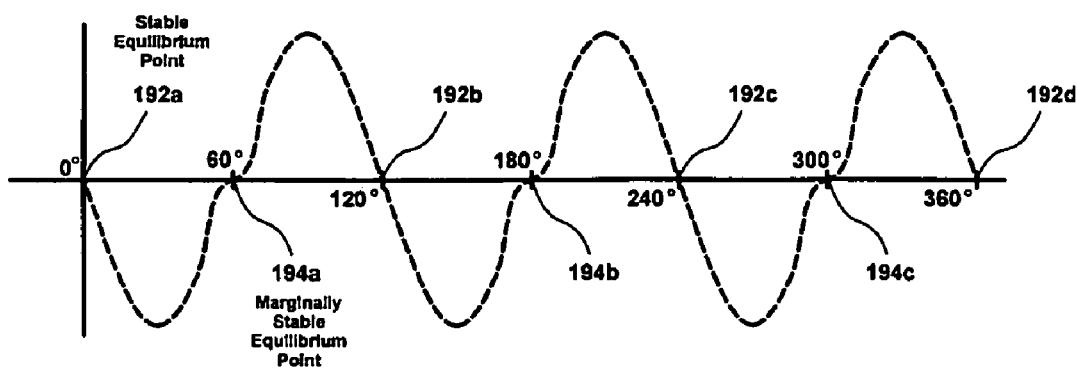
FIG. 9b is a graph of the torque experienced by the shaft of the rotary actuator of FIG. 9a as the shaft and the two inner magnet subassemblies rotate with respect to the outer magnet subassemblies.
Figure 9C:
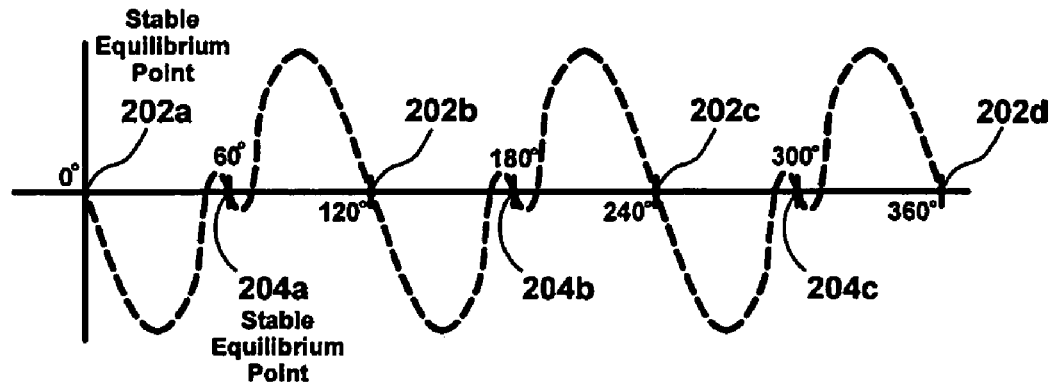
FIG. 9c is another graph of the torque experienced by the shaft of the rotary actuator of FIG. 9a as the shaft and the two inner magnet subassemblies rotate with respect to the outer magnet subassemblies, this time using increased torque modification.

FIG. 9b graphs the torque versus rotation angle of the combined assembly 180. Without torque modification magnet assembly 160, the 60, 180, and 300 degree points in FIG. 9b would be unstable equilibrium points, as described previously. With torque modification magnet assembly 160, however, those points (194a-c) are now marginally stable equilibrium points—i.e., it takes significantly more torque to destabilize them. If, instead, magnets of increased power are used in torque modification assembly 160, the graph of the torque versus rotation angle of the combined assembly will change to that shown in FIG. 9c. Here the marginally stable equilibrium points 194a-c have become stable equilibrium points 204a-c as illustrated in FIG. 9d in terms of potential energy.

Figure 9D:
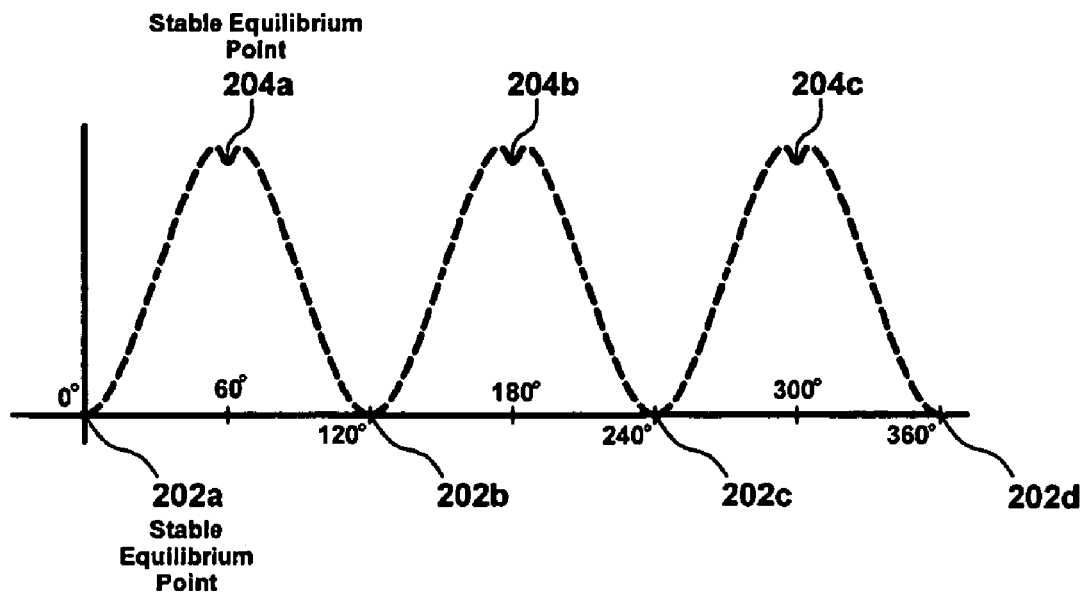
FIG. 9d is a graph of the potential energy at the shaft of the rotary actuator of FIG. 9a as the shaft rotates.

In FIG. 9d, the 60, 180, and 300 degree points 204a-c are "shallow" stable equilibrium points—i.e., a relatively small torque from the motor will push the rotating assembly "over the edge" and out of stable equilibrium. Once out of stable equilibrium, the rotating assembly will accelerate rapidly, pass through one of the "deep" stable equilibrium points 202a-d, and decelerate as the rotating assembly approaches the next shallow equilibrium point. At this point, another small torque input from the motor will push the rotating assembly over the peak and into the shallow equilibrium point 204a-c.

By monitoring the shaft encoder, the control processor can determine when to activate the motor so as to provide the torque pulses required to achieve the desired motion. The result is a rotary actuator that will maintain specific angular positions corresponding to the shallow equilibrium points or "operating detents", with no torque required from the motor and thus no power consumption while in such shallow equilibrium. When desired, a relatively small torque input from the motor will cause the actuator to "snap" to the next detent at high speed, where it is captured by another small torque input from the motor. In spite of its high speed, this movement between shallow equilibrium points 204a-c requires no power input other than the small torque pulses necessary to destabilize and subsequently recapture the rotating assembly and to compensate for friction or drag. If the rotating assembly is stuck in one of the "deep" equilibrium points 202a-d when the unit is first powered up or due to a control malfunction, even a low torque motor can "bounce" it back and forth, gradually increasing the angular extent of each spring bounce, until the rotating assembly reaches one of the operating detents and can be captured there in the shallow equilibrium point 204a-c. Although the actuator 180 and its related primary magnetic assembly 140 and torque modification assembly 160 are shown as a rotary configuration, it should be readily apparent that an "unrolled" or otherwise linear arrangement is possible without straying from the intended scope of the present invention. Such a linear variation would exhibit the same characteristics as detailed in FIGS. 9a-c.

FIGS. 10 through 14 describe an implementation of the linear format of a magnetic spring in accordance with the present invention. Specifically, this involves direct replacement of a conventional mechanical valve spring used in internal combustion engines with a magnetic valve spring in accordance with the present invention.

Figure 10B:
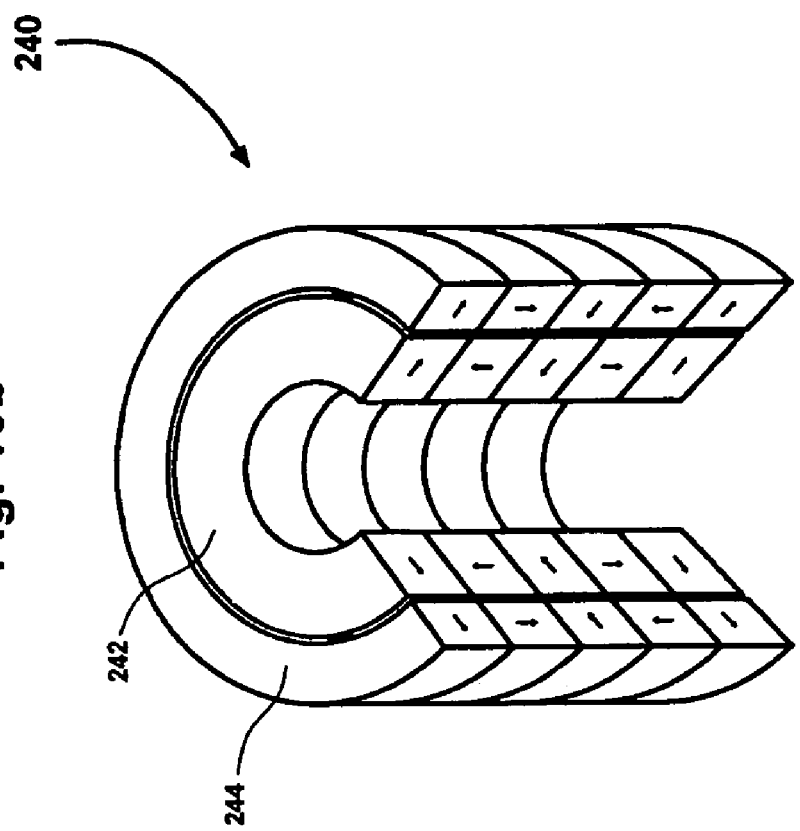
FIG. 10b shows a partial cutaway view of concentric cylindrical Halbach magnet arrays configured to form a high-force valve spring for a cam-driven engine in accordance with another embodiment of the present invention.
Figure 10A:
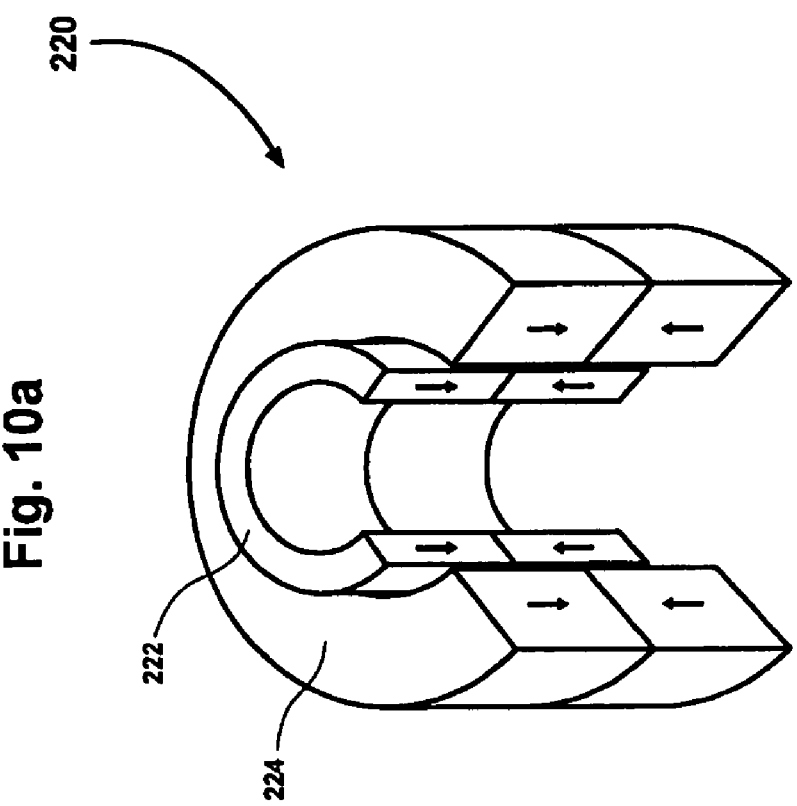
FIG. 10a shows a partial cutaway view of concentric cylindrical magnets configured to form a valve spring for a cam-driven engine in accordance with another embodiment of the present invention.

FIG. 10a shows a cylindrical magnetic spring 220 similar in principles to design 100 depicted in FIG. 6a. In magnetic spring 220 of FIG. 10a, the vertical thickness of each magnet ring in inner array 222 and outer array 224 has been doubled, thereby doubling the magnetic wavelength, and the number of rings in each array has been decreased. This increases the travel distance of the moving assembly without reversing the direction of magnetic force. In linear magnetic spring 240 of FIG. 10b, Halbach arrays with 90° rotation increments are used in inner array 242 and outer array 244 both to increase the amount of force delivered per unit of magnet mass and to increase the wavelength of the array. Magnet rings with radial magnetization can be approximated using ring segments with transverse magnetization, as is conventionally done.

Figure 11:
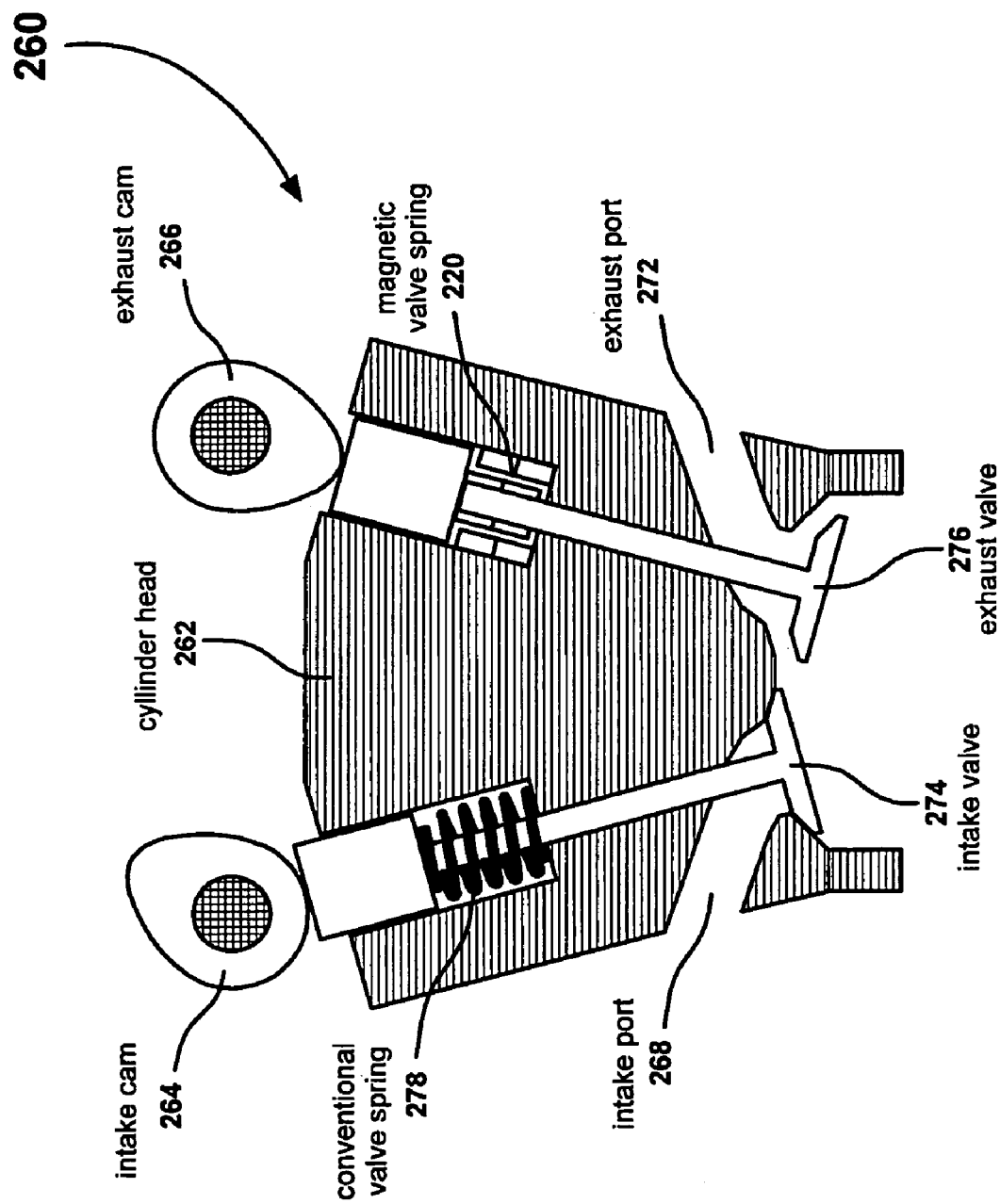
FIG. 11 is a cross-section of a cylinder head illustrating for the sake of comparison both a conventional mechanical spring on the intake valve and a magnetic spring in accordance with the present invention on the exhaust valve.

As shown in cylinder head assembly 260 of FIG. 11, magnetic springs of this type would be installed in an engine in a manner similar to conventional valve springs. Specifically, the linear magnetic spring 220 of FIG. 10a is used in FIG. 11. While both a conventional valve spring and a magnetic valve spring are shown, it should be understood that this is for purposes of illustration and not meant to suggest mixed use of a conventional valve spring with a magnetic valve spring.

In FIG. 11, the intake cam 264 provides the force required to open intake valve 274, allowing fuel and air to enter the cylinder through intake port 268. Conventional valve spring 278 provides the force required to close intake valve 274. Exhaust cam 266 provides the force required to open exhaust valve 276, allowing exhaust gases to leave the cylinder through exhaust port 272. Magnetic valve spring 282 provides the force required to close exhaust valve 276, much like a conventional valve spring. However, magnetic valve springs are quite different from conventional mechanical springs in several respects and offer significant potential advantages as discussed above in regard to magnetic springs in accordance with the present invention. While FIG. 11 is generally illustrative of a magnetic spring valve, specific operational details are shown and described in regard to FIGS. 12, 13a-c, and 14a-c.

Figure 12:
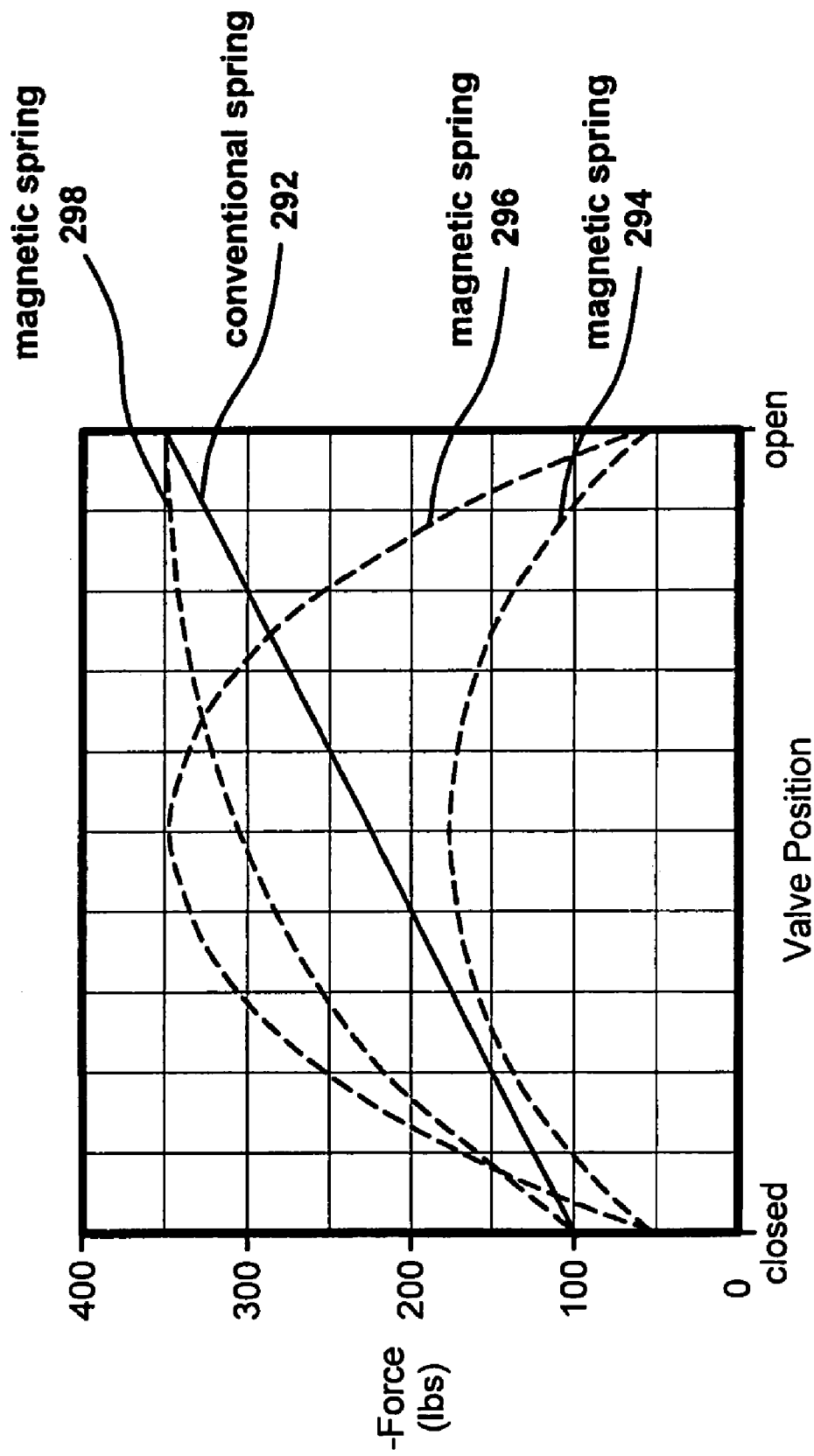
FIG. 12 is a graph comparing the force vs. valve position of a conventional valve spring and three magnetic valve springs in accordance with the present invention.

The force characteristics of conventional and magnetic springs are compared in FIG. 12. A conventional mechanical spring can be selected to provide a particular force when the engine valve is closed (100 lbs in this case), and a larger particular force when the valve is open and the spring is compressed (350 lbs in this case). The spring force exhibited in between those two points is described by straight line 292. With a magnetic spring, on the other hand, the force at valve closed, the force at valve open, and the shape of the force curve in between can all be selected over a wide range by varying the wavelength of the magnet arrays and the phase relationship of the moving and stationary assemblies at the valve closed position. In the example as shown, magnetic spring 294 is designed to provide about 50 lbs of force with the valve closed, about 50 lbs of force with the valve open, and a peak of about 175 lbs in between. The curve shown for magnetic spring 294 corresponds to part of one half-wavelength of the magnetic spring curve shown in FIG. 2b. Magnetic spring 296 also provides about 50 lbs of force at each end, but its peak force is 350 lbs in between. Magnetic spring 298 has the same force as conventional mechanical spring 292 at each end of its travel, but a higher force everywhere in between. An important point to note is that magnetic spring force characteristics can be designed to more closely approximate the needs of a particular engine than can a mechanical spring.

Due to their higher force over most of the range of movement, both magnetic springs represented by curves 296 and 298 in FIG. 12 can provide substantially higher rpm capability before onset of valve float than will conventional spring 292—without increasing the peak spring force. Specifically, the peak force of magnetic spring 296 could be decreased by 50-100 lbs while still providing performance equal to or better than conventional spring 292, when combined with a cam profile optimized for use with the magnetic spring. Such a cam profile would be designed in such a manner so as to provide slower onset and release of valve acceleration (reduced jerk), decreasing engine vibration and valve touchdown speed. Lower forces on the cam would lower friction losses, increasing engine power and efficiency. In addition, magnetic springs will not suffer from metal fatigue or contact wear, thus providing the potential for increased reliability and longevity, and will allow the use of tuned eddy-current damping to suppress resonances and vibration. However, it is important to note that the magnets must not be overheated and care must be taken in the design of applications utilizing magnetic springs in accordance with the present invention so as to reduce heating of the magnets themselves. If such magnets exceed maximum working temperature (up to 180° C. for neodymium and 350° C. or higher for samarium cobalt) they will lose their magnetization and cease to provide any spring force.

FIG. 13a is an enlarged cross-section of a magnetic valve assembly similar to the engine valve shown in FIG. 11. FIG. 13a shows one configuration of magnets suitable to create a magnetic spring 296, as graphed in FIG. 12. In FIG. 13a, the valve is in the closed position with the magnetic spring forced to the limit of its mechanically allowable travel. This alignment of the two magnet arrays of magnetic spring 296 is near a stable equilibrium point, comparable to point 56a or 56b in FIG. 3b. In FIG. 13b, the valve is in the open position with magnetic spring 296 extended to the opposite limit of its mechanically allowable travel. This alignment is near an unstable equilibrium point, comparable to point 58a or 58b of FIG. 3b. FIG. 13c is a graph comparing the compression force vs. spring compression distance for magnetic spring 296, with the "valve closed" and "valve open" points (the limits of mechanically allowable travel) indicated on the curve.

FIG. 14a is an enlarged cross-section of an engine valve assembly showing one configuration of magnets suitable to create a magnetic spring 298, as graphed in FIG. 12. This configuration includes fewer magnet elements, each of which are of increased length in the vertical dimension to increase the wavelength of the magnetic spring. In FIG. 14a the valve is in the closed position, with the magnetic spring forced to the limit of its mechanically allowable travel. Again, this alignment of the two magnet arrays of magnetic spring 298 is near a stable equilibrium point, comparable to point 56a or 56b in FIG. 3b. In FIG. 14b the valve is in the open position, with magnetic spring 296 extended to the opposite limit of its mechanically allowable travel. This alignment corresponds to the maximum force point halfway between an unstable equilibrium point and a stable equilibrium point such as points 56a and 58b of FIG. 3b. FIG. 14c is a graph comparing the compression force vs. spring compression distance for magnetic spring 298 with the "valve closed" and "valve open" points (the limits of mechanically allowable travel) indicated on the curve.

What is claimed is:

1. A rotary actuator, said rotary actuator comprising:
an arrangement of magnets including at least two arrays movable relative to one another and forming a plurality of stable equilibrium points and a plurality of unstable equilibrium points, said plurality of stable equilibrium points located about a rotational axis of said rotary actuator and said plurality of unstable equilibrium points located about said rotational axis of said rotary actuator and interspersed between said plurality of stable equilibrium points; and
wherein said rotary actuator is capable of moving towards and past any given one of said stable equilibrium points in a springing manner via magnetic forces created by said arrangement of magnets and said rotary actuator is capable of being moved towards and held in any given one of said unstable equilibrium points in a stationary manner via low power forces created by a motive source.

2. The rotary actuator as claimed in claim 1 wherein said plurality of unstable equilibrium points includes a shallow stable equilibrium point centered within each of said plurality of unstable equilibrium points such that said rotary actuator is capable of being moved into any given one of said unstable equilibrium points via said motive source and held in a corresponding one of said shallow stable equilibrium points in a stationary manner via magnetic forces created by said arrangement of magnets.

3. The rotary actuator as claimed in claim 2 further including
an inner array of permanent magnets arranged circularly and having magnetic poles radially oriented in alternating directions of magnetization,
an outer array of permanent magnets arranged circularly and having magnetic poles radially oriented in alternating directions of magnetization in a manner identical to said inner array,
where said inner array and said outer array are arranged concentric to one another such that at least one of said inner array and said outer array are rotatable relative one to another via said magnetic forces and said low power forces.

4. The rotary actuator as claimed in claim 2 further including
an inner array of permanent magnets arranged circularly and having magnetic poles oriented so as to form a first Halbach array,
an outer array of permanent magnets arranged circularly and having magnetic poles oriented so as to form a second Halbach array,
where said magnetic forces are created in a region between said first Halbach array and said second Halbach array, and said inner array and said outer array are arranged concentric to one another such that at least one of said inner array and said outer array are rotatable relative one to another via said magnetic forces and said low power forces.

5. The rotary actuator as claimed in claim 2 further including
an inner array of elongated permanent magnets arranged circularly and having magnetic poles oriented so as to form a first Halbach array,
an outer array of elongated permanent magnets arranged circularly and having magnetic poles oriented so as to form a second Halbach array,
where said magnetic forces are created in a region between said first Halbach array and said second Halbach array, and said inner array and said outer array form cylinders that are arranged concentric to one another such at least one of said inner array and said outer array are rotatable relative one to another via said magnetic forces and said low power forces.

6. A linear actuator, said linear actuator comprising:
an arrangement of magnets including at least two arrays movable relative to one another and forming a plurality of stable equilibrium points and a plurality of unstable equilibrium points, said plurality of stable equilibrium points located along a linear dimension of said linear actuator and said plurality of unstable equilibrium points located about said linear dimension of said linear actuator and interspersed between said plurality of stable equilibrium points; and
wherein said linear actuator is capable of moving towards and past any given one of said stable equilibrium points in a springing manner via magnetic forces created by said arrangement of magnets and said linear actuator is capable of being moved towards and held in any given one of said unstable equilibrium points in a stationary manner via low power forces created by a motive source.

7. The linear actuator as claimed in claim 6 wherein said plurality of unstable equilibrium points includes a shallow stable equilibrium point centered within each of said plurality of unstable equilibrium points such that said linear actuator is capable of being moved into any given one of said unstable equilibrium points via said motive source and held in a corresponding one of said shallow stable equilibrium points in a stationary manner via magnetic forces created by said arrangement of magnets.

8. The linear actuator as claimed in claim 6 further including
a first array of permanent magnets arranged linearly and having magnetic poles oriented along the direction of actuation in alternating directions of magnetization,
a second array of permanent magnets arranged linearly and having magnetic poles oriented along the direction of actuation in alternating directions of magnetization in a manner identical to said first array,
where at least one of said first array and said second array is linearly moveable along the direction of actuation relative one to another via said magnetic forces and said low power forces.

9. The linear actuator as claimed in claim 6 further including
an first array of permanent magnets arranged linearly and having magnetic poles oriented so as to form a first Halbach array,
a second array of permanent magnets arranged linearly and having magnetic poles oriented so as to form a second Halbach array,
where said magnetic forces are created in a region between said first Halbach array and said second Halbach array, and at least one of said first array and said second array is linearly moveable relative one to another via said magnetic forces and said low power forces.

10. The linear actuator as claimed in claim 6 further including
an inner array of permanent magnets arranged adjacent one another and disposed about a linear axis, said permanent magnets having magnetic poles axially oriented in alternating directions of magnetization,
an outer array of permanent magnets arranged adjacent one another and disposed about said linear axis, said permanent magnets having magnetic poles axially oriented in alternating directions of magnetization in a manner identical to said inner array, where said outer array is radially disposed about said inner array and at least one of said inner array and said outer array is moveable relative one to another along said linear axis via said magnetic forces and said low power forces.

11. The linear actuator as claimed in claim 6 further including an inner array of permanent magnets arranged adjacent one another and disposed about a linear axis, said permanent magnets having magnetic poles axially oriented in alternating directions of magnetization, an outer array of permanent magnets arranged adjacent one another and disposed about said linear axis, said permanent magnets having magnetic poles axially oriented in alternating directions of magnetization in a manner opposite to said inner array, where said outer array is radially disposed about said inner array and at least one of said inner array and said outer array is moveable relative one to another along said linear axis via said magnetic forces and said low power forces.

12. The linear actuator as claimed in claim 6 further including an inner array of permanent magnets arranged adjacent one another and disposed about a linear axis, said permanent magnets having magnetic poles axially oriented so as to form as a first Halbach array, an outer array of permanent magnets arranged adjacent one another and disposed about said linear axis, said permanent magnets having magnetic poles axially oriented so as to form as a second Halbach array, where said magnetic forces are created in a region between said first Halbach array and said second Halbach array, and said outer array is radially disposed about said inner array and at least one of said inner array and said outer array is moveable relative one to another along said linear axis via said magnetic forces and said low power forces.

13. A rotary actuator, said rotary actuator comprising:

a plurality of stable equilibrium points formed by an arrangement of magnets, said plurality of stable equilibrium points located about a rotational axis of said rotary actuator;

a plurality of unstable equilibrium points formed by said arrangement of magnets, said plurality of unstable equilibrium points located about said rotational axis of said rotary actuator and interspersed between said plurality of stable equilibrium points;

said rotary actuator is capable of moving towards and past any given one of said stable equilibrium points in a springing manner via magnetic forces created by said arrangement of magnets and said rotary actuator is capable of being moved towards and held in any given one of said unstable equilibrium points in a stationary manner via low power forces created by a motive source;

said plurality of unstable equilibrium points includes a shallow stable equilibrium point centered within each of said plurality of unstable equilibrium points such that said rotary actuator is capable of being moved into any given one of said unstable equilibrium points via said motive source and held in a corresponding one of said shallow stable equilibrium points in a stationary manner via magnetic forces created by said arrangement of magnets;

an inner array of permanent magnets arranged circularly and having magnetic poles oriented so as to form a first Halbach array;

an outer array of permanent magnets arranged circularly and having magnetic poles oriented so as to form a second Halbach array;

said magnetic forces are created in a region between said first Halbach array and said second Halbach array, and said inner array and said outer array are arranged concentric to one another such that at least one of said inner array and said outer array are rotatable relative one to another via said magnetic forces and said low power forces;

an inner subassembly of permanent magnets arranged circularly and having magnetic poles oriented all in a first direction;

an outer subassembly of permanent magnets arranged circularly and having magnetic poles oriented all in a second direction, said second direction being identical to said first direction and arranged such that said permanent magnets of said inner subassembly are attracted to said permanent magnets of said outer subassembly;

said inner subassembly and said outer subassembly are arranged concentric to one another such that at least one of said inner subassembly and said outer subassembly are rotatable relative one to another via a shaft coupling said inner subassembly to said inner array; and said plurality of unstable equilibrium points includes a shallow stable equilibrium point centered within each of said plurality of unstable equilibrium points such that said rotary actuator is capable of being moved into any given one of said unstable equilibrium points via said motive source and held in a corresponding one of said shallow stable equilibrium points in a stationary manner via magnetic forces created by said arrangement of magnets.

14. A rotary actuator, said rotary actuator comprising:

a plurality of stable equilibrium points formed by an arrangement of magnets, said plurality of stable equilibrium points located about a rotational axis of said rotary actuator;

a plurality of unstable equilibrium points formed by said arrangement of magnets, said plurality of unstable equilibrium points located about said rotational axis of said rotary actuator and interspersed between said plurality of stable equilibrium points;

wherein said rotary actuator is capable of moving towards and past any given one of said stable equilibrium points in a springing manner via magnetic forces created by said arrangement of magnets and said rotary actuator is capable of being moved towards and held in any given one of said unstable equilibrium points in a stationary manner via low power forces created by a motive source;

said plurality of unstable equilibrium points includes a shallow stable equilibrium point centered within each of said plurality of unstable equilibrium points such that said rotary actuator is capable of being moved into any given one of said unstable equilibrium points via said motive source and held in a corresponding one of said shallow stable equilibrium points in a stationary manner via magnetic forces created by said arrangement of magnets;

an inner array of elongated permanent magnets arranged circularly and having magnetic poles oriented so as to form a first Halbach array;

an outer array of elongated permanent magnets arranged circularly and having magnetic poles oriented so as to form a second Halbach array;

said magnetic forces are created in a region between said first Halbach array and said second Halbach array, and said inner array and said outer array form cylinders that are arranged concentric to one another such at least one of said inner array and said outer array are rotatable relative one to another via said magnetic forces and said low power forces;

an inner subassembly of permanent magnets arranged circularly and having magnetic poles oriented all in a first direction;

an outer subassembly of permanent magnets arranged circularly and having magnetic poles oriented all in a second direction, said second direction being identical to said first direction and arranged such that said permanent magnets of said inner subassembly are attracted to said permanent magnets of said outer subassembly;

said inner subassembly and said outer subassembly are arranged concentric to one another such that that at least one of said inner subassembly and said outer subassembly are rotatable relative one to another via a shaft coupling said inner subassembly to said inner array; and said plurality of unstable equilibrium points includes a shallow stable equilibrium point centered within each of said plurality of unstable equilibrium points such that said rotary actuator is capable of being moved into any given one of said unstable equilibrium points via said motive source and held in a corresponding one of said shallow stable equilibrium points in a stationary manner via magnetic forces created by said arrangement of magnets.

* * * * *